United States Patent [19]
Brunskill et al.

[11] Patent Number: 5,145,124
[45] Date of Patent: Sep. 8, 1992

[54] FLUID CONDITIONING SYSTEM AND APPARATUS

[75] Inventors: Michael R. Brunskill, Rollings Hills Estates; Wilfred G. McKelvey, Rancho Palos Verdes, both of Calif.

[73] Assignee: Allied-Signal Inc., Morris Township, Morris County, N.J.

[21] Appl. No.: 551,334

[22] Filed: Jul. 12, 1990

[51] Int. Cl.$^5$ .............................................. B64D 13/00
[52] U.S. Cl. ..................................... 244/118.5; 454/74
[58] Field of Search ......................... 244/118.5; 98/1.5

[56] References Cited

U.S. PATENT DOCUMENTS

| | | | |
|---|---|---|---|
| 2,870,698 | 1/1959 | Best | 98/1.5 |
| 3,711,044 | 1/1973 | Matulich | 244/118.5 |
| 4,261,416 | 4/1981 | Hamamoto | 244/118.5 |
| 4,263,786 | 4/1981 | Eng | 62/172 |
| 4,462,561 | 7/1984 | Cronin | 244/118.5 |
| 4,485,729 | 12/1984 | Crittenden et al. | 98/1.5 |
| 4,966,005 | 10/1990 | Cowell et al. | 62/172 |

OTHER PUBLICATIONS

Robert Jorgensen, *Fan Engineering*, 1883 Buffalo Forge Co., pp. 15-4 through 15-7, 15-30 through 15-31, 212-215, 9-2 through 9-5, 10-14 through 10-17, Ashrae Guide & Data Book.
American Society of Referigeration and Air Conditioning Engineers, pp. 51.13-51.17.

*Primary Examiner*—Joseph F. Peters, Jr.
*Assistant Examiner*—Anne E. Bidwell
*Attorney, Agent, or Firm*—David B. Abel; Terry L. Miller; Robert A. Walsh

[57] ABSTRACT

An environmental control system for an aircraft including a variable bleed air flow control valve, an air cycle air conditioning device, and a variable recirculation air flow fan. The system is configured to maintain a desired minimum volumetric air circulation flow rate through the aircraft with variable passenger fresh air requirements met by bleed air flow.

14 Claims, 4 Drawing Sheets

FLUID CONDITIONING SYSTEM AND APPARATUS

BACKGROUND OF INVENTION

The present invention pertains to the field of aircraft environmental control systems, and is more particularly concerned with providing an improved method and apparatus for optimizing engine bleed air extraction while improving passenger comfort. Environmental control systems are commonly used on both commercial and military aircraft transports, as well as smaller commercial aircraft. The most applicable use of the present invention is for commercial aircraft that have electronic control capability, and varying passenger loading. The invention is also applicable to aircraft with a less sophisticated control system which desire improved fuel economy and passenger comfort.

Briefly stated, an environmental control system (ECS) provides conditioned, pressurized air to cool (or heat) ventilate and pressurize an aircraft cabin. The ECS typically incorporates a flow control valve whose purpose is to regulate the inflow of fresh air into the cabin to a predetermined level. This level is determined by the fresh air ventilation requirements of the cabin occupants and the amount of cooling capacity required to achieve a comfortable cabin environment. On earlier aircraft utilizing low-pressure water separation systems, the temperature of the fresh air could not be lower than 32° F. to avoid ice formation in the water removal devices and the aircraft ducting. This generally provided more fresh air flow for cooling purposes than was actually required for ventilation. However, with the introduction of high pressure water separation, the fresh air supplied by the air conditioning system could be provided at subfreezing temperatures, with recirculated cabin air raising the temperature to above freezing before entering the main aircraft distribution system. The cooling requirements, therefore, could be met with a smaller amount of fresh air than for a comparable low pressure water separation system. This type of system is detailed within U.S. Pat. No. 4,198,830, herein incorporated by reference.

Current systems optimize the relationship between fresh air flow and recirculation flow to balance the fresh air requirements with the cooling requirements and the need for circulation of air through the cabin. The total amount of airflow required to maintain adequate circulation is primarily a function of the cabin volume. Modern aircraft having sophisticated electronic systems can reduce the amount of fresh air flow into the cabin as a function of a reduced passenger loading. By inputting the number of passengers on board, an electronic flow control valve can be adjusted to provide only the fresh air required for those passengers. This has the benefit of saving fuel while still providing a comfortable cabin environment. However, when reducing the fresh air flow, the total ventilation rate is also reduced. This could result in less than optimum air circulation throughout the aircraft cabin, creating "dead" zones of warm, cold or stale air. Some aircraft attempt to counteract this occurrence to some degree by selective activation of recirculation fans, but these are typically combined with low pressure water separation systems that provide more fresh air flow than is required for cooling. Thus, in order to obtain an optimum total ventilation rate, more fans would be required than is actually necessary to provide for normal operation. The associated extra weight and power required for these fans is disadvantageous within the limitations inherent within aircraft applications.

The present invention is intended to maintain the optimum cabin air circulation, and hence passenger comfort, while achieving the fuel savings associated with reductions in fresh air flow with passenger loadings lower than the design point of the aircraft.

SUMMARY OF THE INVENTION

The present invention defines an environmental control system (ECS), for use in providing a flow of conditioned, pressurized, ventilation air to an enclosed space such as an aircraft cabin. The ECS operates in conjunction with a bleed air control system, which bleed air control system receives a flow of pressurized bleed air from a source thereof, such as the aircraft main engines or an auxiliary power unit (APU). The ECS also includes cabin air recirculation means for extracting air from the aircraft cabin and directing the air to a mixing manifold, wherein the recirculation air is combined with the conditioned bleed air, prior to delivery to the aircraft cabin. The ECS also includes control means for controlling the amount of bleed air taken from the aircraft engines, dependent upon fresh air requirements of the cabin, and for variably controlling the flow of recirculation air such that the flow of air through the cabin is maintained at a desirable level.

The ECS and associated control system maintain an optimum amount of total air flow to the aircraft passenger cabin to provide a comfortable environment, while allowing fuel savings associated with the reduction of bleed air flow required to provide fresh air into the cabin. The present invention accomplishes both of these goals by providing a means to increase the amount of recirculated air flow as fresh air flow is decreased. In a preferred embodiment, inlet guide vanes are used in conjunction with an electric motor driven recirculation fan(s) to vary the recirculated flow. Alternatively, variable flow in the ECS is obtained by varying the speed of the motor. However, for an AC motor driven fan, the speed controls that can provide for variable speed are complicated, heavy, and inefficient. Inlet guide vanes are preferred in that they achieve the variation in flow with the fan turning at a constant speed, or alternatively with a fan having a limited number of discreet speeds. The present ECS thus provides for optimum efficiency over the design flow range of the fan(s), in addition to simplifying the control mechanism.

DETAILED DESCRIPTION OF THE PREFERRED EMBODIMENT

Figure 1A:
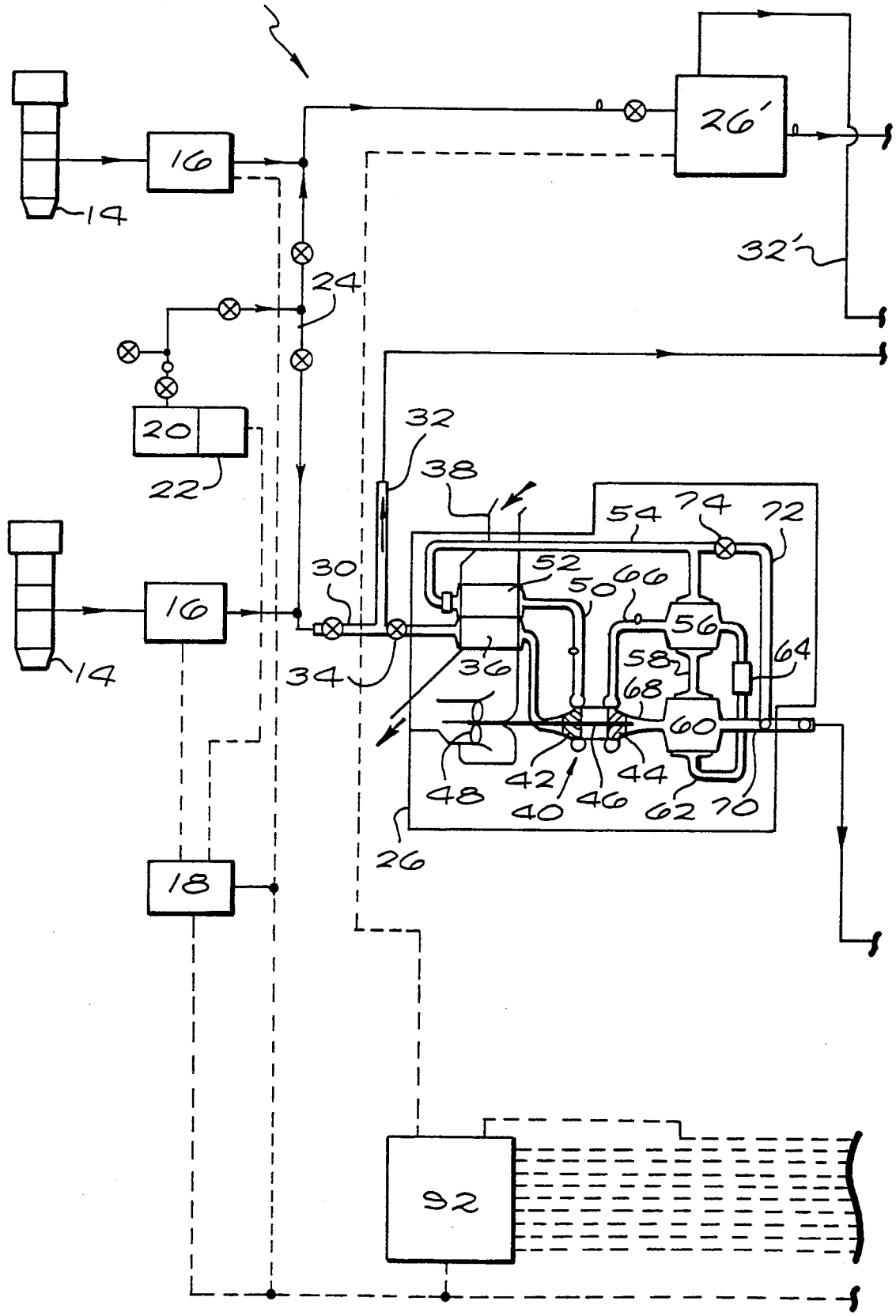
FIGS. 1A and 1B depicts a schematic representation of an environmental control system according to the invention for use with an aircraft.
Figure 1B:
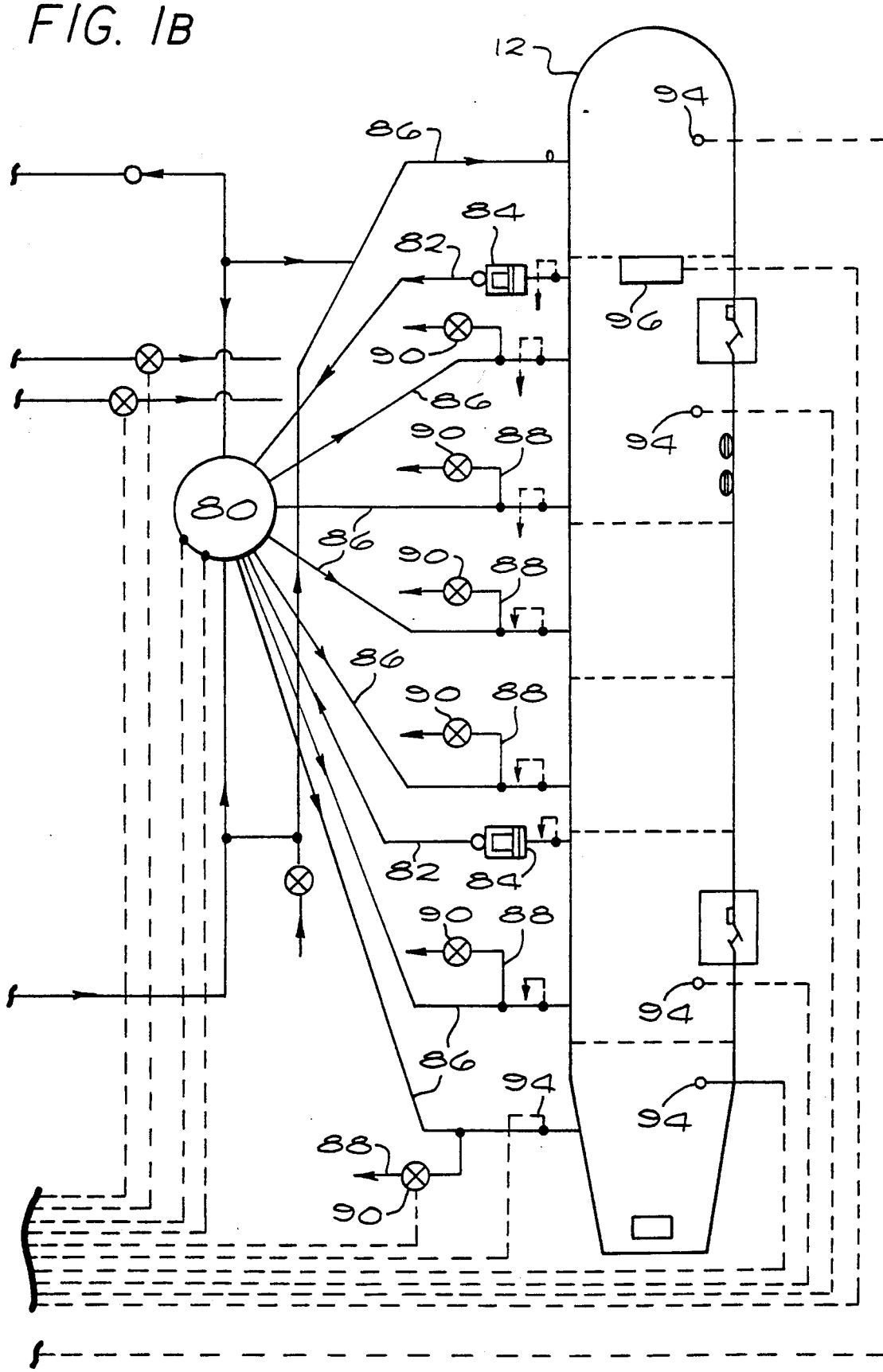

FIGS. 1A and 1B depicts a schematic view of an environmental control system (ECS) 10 for use in providing conditioned pressurized air to an enclosed space such as an aircraft cabin 12. The ECS 10 is configured to receive a fresh air flow in the form of pressurized bleed air from the aircraft engines 14, via bleed air control packs 16 which are controlled by air supply controllers 18. Alternatively, an auxiliary power unit (APU) 20 may be used to supply the pressurized bleed air. The pressurized bleed air from either the engines 14 or APU 20 is directed to a bleed air distribution system 24 which provides flow control and routes the pressurized bleed air to ducts 30, which ducts 30 subsequently direct the pressurized bleed air to cooling packs 26. The system may also include trim air lines 32 which may divert a portion of the bleed air flow around the cooling packs 26. Bleed air flow through the bleed air line 30 is controlled by a bleed air control valve 34.

The bleed air which enters each of the cooling packs 26 is first directed to a primary heat exchanger 36 wherein it is cooled in air to air heat exchange relationship with a flow of ram air routed to the cold side of primary heat exchanger 36 via a ram air duct 38. The bleed air exiting primary heat exchanger 36 is then ducted to an air cycle machine 40, and in particular to the compressor 42 thereof. The air cycle machine 40 also includes a turbine 44 which drives compressor 42 via a shaft 46. The air cycle machine may also include a fan 48 also connected to shaft 46 and thereby driven by turbine 44. Fan 48 may also be disposed within the ram air duct 38 to promote ambient or ram air flow therethrough. The bleed air is further compressed within compressor 42 and then ducted via a duct 50 to a secondary heat exchanger 52 which is also disposed within ram air duct 38. Therein, the compressed bleed air is further cooled in air to air heat exchange relationship with the flow of ram air. The air flow exiting secondary heat exchanger 52 is then routed via duct 54 to a reheater 56, and specifically to the hot pass side thereof. The air is then ducted via duct 58 to a condenser 60 and more specifically to the hot pass side thereof wherein the bleed air is further cooled resulting in condensation of entrained moisture. The bleed air exiting condenser 60 is routed via duct 62 through a water separator 64 wherein the condensed moisture is removed. Next, the bleed air is ducted to the cold pass side of the reheater 56 wherein the air is reheated in air to air heat exchange relationship with the pressurized bleed air flowing through the hot pass side of reheater 56. Duct 66 then conducts the air from reheater 56 to the turbine 44 of air cycle machine 40. The pressurized bleed air flow is expanded through turbine 44 and exits via duct 68. The expanded, cool bleed air is then routed through the cold pass side of condenser 60 where it is warmed in air to air heat exchange relationship with the pressurized bleed air flowing through the hot pass side thereof. The expanded air from condenser 60 is then conducted via duct 70 to a mix manifold 80. The ECS 10 may also include a by-pass duct 72 and a control valve 74 therein which diverts a flow of the pressurized bleed air from duct 54 to duct 70, thereby by-passing reheater 56, condenser 60 and turbine 44. This by-pass duct 72 provides temperature control capability for the pressurized air flow exiting the cooling pack 26.

FIGS. 1A and 1B includes two cooling packs 26, only one of which depicts the details of the sub-components as itemized above. However, it is to be understood that the second cooling pack 26 is also similarly configured. Details of the operation of cooling packs 26 are more completely within the U.S. Pat. No. 4,198,830 herein specifically incorporated by reference. For the present application, it is sufficient to describe the cooling packs 26 to the extent that the cooling packs 26 are capable of conditioning the bleed air taken from the engines 14 or auxiliary power unit 20 to provide cooled pressurized air for use within the aircraft cabin 12. More particularly, the air exiting the cooling packs 26 may be provided at sub-freezing temperatures. Accordingly, the cooling packs 26 provide a means for receiving high temperature high pressure bleed air and for conditioning the high temperature high pressure bleed air to provide a flow of pressurized, cool, fresh conditioned air to the aircraft cabin 12.

The cooled pressurized fresh air flow exiting the cooling packs 26 is ducted to the mix manifold 80 wherein the separate flows are combined. Mix manifold 80 also receives a flow of recirculation air from the aircraft cabin 12 which is ducted thereto via at least one recirculation air duct 82. The recirculation duct(s) 82 also includes a recirculation fan(s) 84. The recirculation air routed to the mix manifold 80 via the recirculation air duct 82 is therein mixed with the pressurized cooled air from cooling packs 26, and subsequently then ducted via a plurality of distribution air ducts 86 to the aircraft cabin 12. Each of the distribution air ducts 86 may also include a connection with a trim air flow duct 88 which is in flow communication with the trim air line 32. The trim air provides a source of heating to the aircraft during operation at particularly cold temperatures by ducting the pressurized bleed air from the aircraft engines 14 completely around the cooling packs 26. Flow control through the trim air line 32 and trim air ducts 88 is provided by trim air flow control valves 90.

The ECS 10 may also include a pair of ECS controllers 92 which are electrically connected to control the operation of cooling packs 26 as well as electrically connected to control the trim air flow control valves 90. The ECS controllers 92 are further electrically connected to and receive signals from a plurality of temperature sensors 94 located respectively in the mix manifold 80, the distribution air ducts 86, as well as within the cabin 12. In response to the temperatures sensed by the plurality of temperature sensors in the various locations about the ECS 10 air distribution system, the ECS controllers 92 can control the flow and temperature of the air delivered to the cabin 12.

The ECS controllers 92 are connected to a control panel 96 included within the aircraft cabin 12, wherein the number of passengers or the air conditioning load for any particular flight of the aircraft may be input as a parameter for the operation of the ECS controller 92 and the control of the cooling packs 26. For reduced passenger loading, the ECS controller 92 may then signal the air supply controllers 18 to reduce the flow of bleed air required from the engines 14 for use by the cooling packs 26 to a minimum amount required to provide fresh air for the aircraft passengers. The ECS controllers 92 are also electrically connected to control the operation of recirculation fans 84. Thus, the ECS controllers simultaneously increase the flow of air through the recirculation fans 84 which is directed to the mix manifold 80 such that the total air circulation through the air craft cabin 12 is maintained at or above a specified minimum level.

Figure 2:
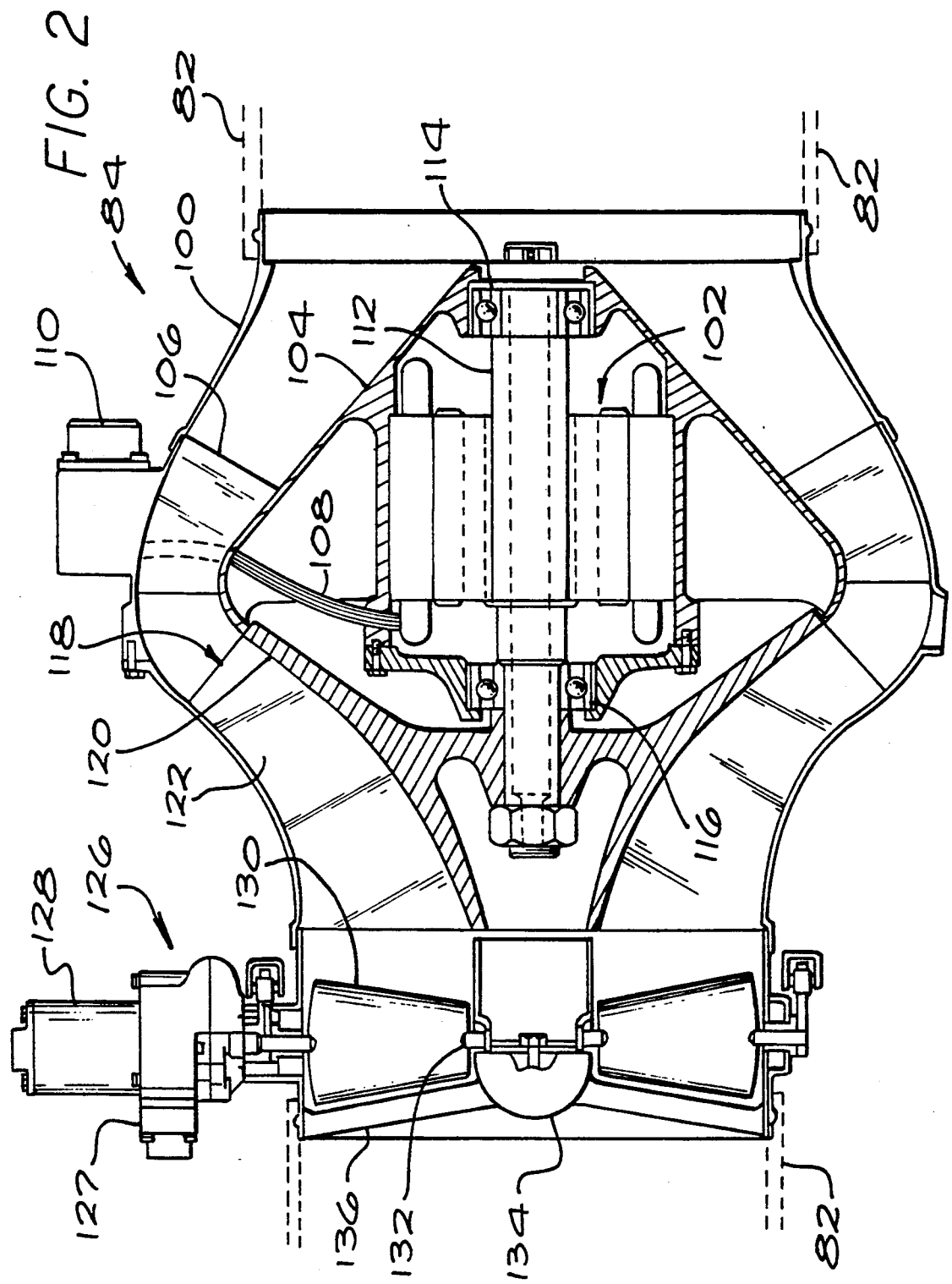
FIG. 2 is a partially schematic partially cross sectional view of a recirculation fan which is incorporated into the ECS of FIGS. 1A and 1 B.

FIG. 2 depicts in partially cross sectional, partially schematic view, an exemplary embodiment of the recirculation fan 84 of the present invention. The recirculation fan 84 is generally configured as an in-line type fan capable of mounting within expanded portions of the ducts 82 of FIGS. 1A and 1B. Accordingly, the recirculation air fans are contained within a housing 100 which is integrally attached at opposite ends to the recirculation air ducts 82 partially shown by phantom lines within FIG. 2. The recirculation fans 84 include an axially aligned motor 102 which is coaxially mounted within the housing 100. The motor 102 is secured within a frame assembly 104 which is in turn secured by a plurality of struts 106 extending through the air path between the frame assembly 104 and the housing 100 radially thereabout. The struts 106 are preferably configured as air foils or diffuser vanes. The motor 102 also requires a power cable 108 which extends across the air flow pathway and through the housing 100 and is attached to a connector 110 externally mounted to the housing 100. Thereby, the power connector 110 allows a power cable (not shown) to be connected to deliver commutation and energization power to the motor assembly 102, via power cable 108. The motor 102 is further defined as including a shaft 112 which is mounted axially within the housing 100, and supported by bearings 114 and 116 generally at opposite ends thereof. Attached to one end of the shaft 112 is a mixed flow (axial inflow-radial outflow) fan 118, which generally includes a hub assembly 120 attached to the shaft 112 and a plurality of fan blades 122 radially extending from the hub 120 into the flow stream of the recirculation air.

The recirculation fan 84 also preferably includes an integrally mounted inlet guide vane assembly 126. The inlet guide vane assembly 126 includes a controller 127, electrically connected to the ECS controllers 92, and motor 128 which is configured to drivingly rotate a plurality of inlet guide vanes 130 which extend into the recirculation air flow path upstream of the fan blades 122. The inlet guide vanes 130 are mounted at their radially outer end to the motor 128 and mounted at their radially inward ends via pins 132 which are pivotally secured to a hub 134 coaxially mounted in the housing 100. The hub 134 is itself supported by a plurality of stabilizer bars 136 which extend radially outward and are secured to the housing 100, thereby axially mounting and securing the hub 134. By this arrangement, the inlet guide vanes 130 are pivotally rotatable with respect to the flow of recirculation air through the recirculation fan 84. The inlet guide vanes can thereby act to throttle the recirculation air flow in response to the command signal from the ECS controllers 92.

Figure 3:
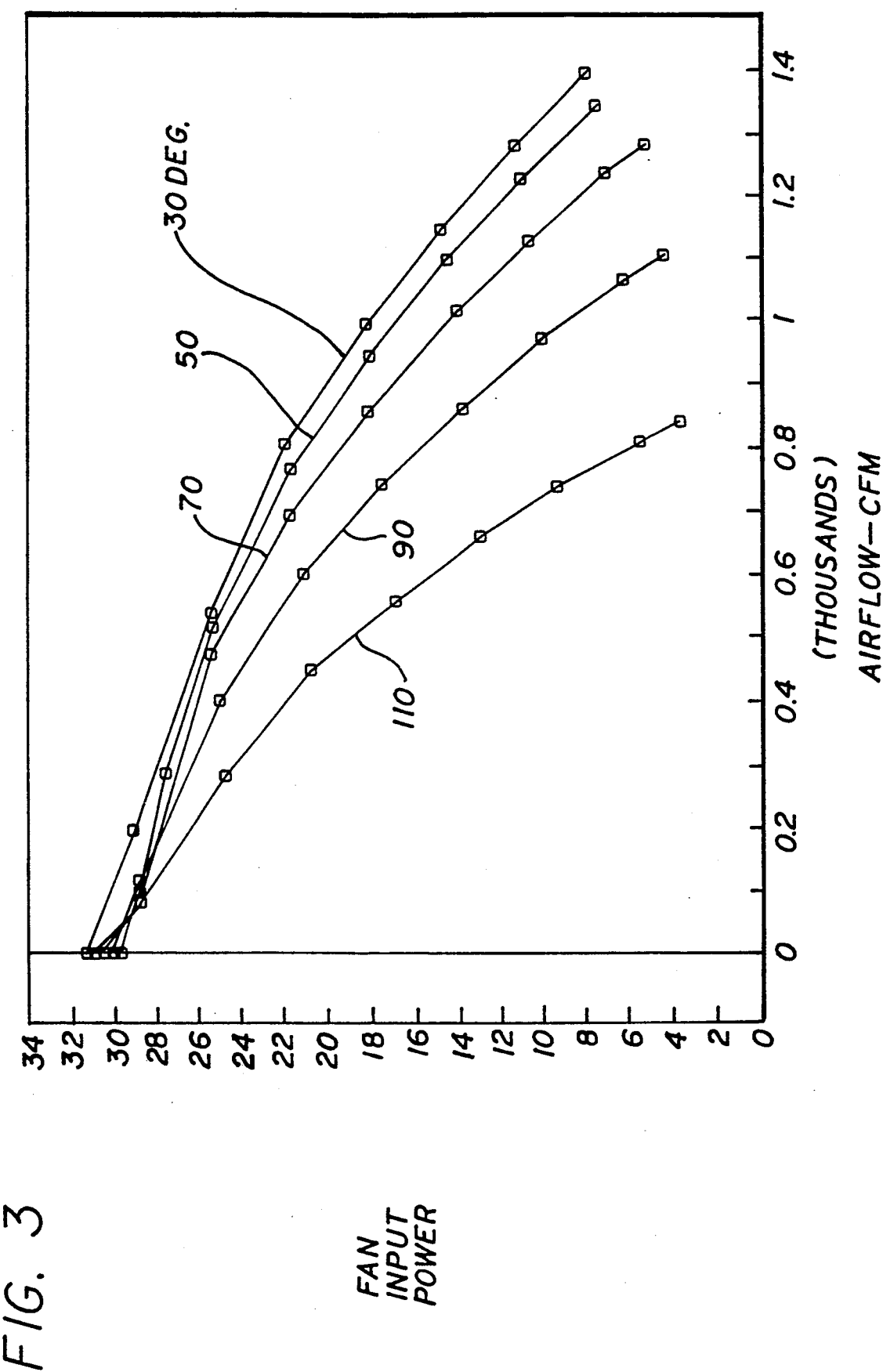
FIG. 3 is a graph depicting air flow in cubic feet per minute plotted against motor input power in kilowatts as a function of inlet guide vane angle.

The inlet guide vanes 130 are rotatable between a zero degree position, and a one hundred eighty degree position, both of which would block air flow through the recirculation duct 82 and fan 84. As depicted in FIG. 2, the inlet guide vanes 130 are at a ninety degree position, parallel to the recirculation air flow path. FIG. 3 depicts air flow through the recirculation fan 84 as a function of input power for various angular orientations of the inlet guide vanes 130. For five different angular orientations (110°, 90°, 70°, 50°, and 30°), the air flow in cubic feet per minute and the input power in kilowatts to the motor 102 changes for a given inlet guide vane 130 position. Thus, the air flow can vary from approximately 720 CFM at one hundred ten degrees to 1320 CFM at the thirty degree position.

In terms of passenger loading, the low flow setting for the inlet guide vanes 130, (thirty degrees) is utilized when the aircraft 12 is transporting the full passenger loading. At this level, the reduced recirculation air is combined with the maximum amount of fresh air from the cooling packs 26. The one hundred ten degree position is set for approximately one-half passenger loading, to provide the requisite circulation when the fresh air from the cooling packs 26 is reduced to the minimum amount required for adequate cooling of the aircraft 12. It may readily be appreciated that for passenger loading between these two limits, the inlet guide vane angle is adjustable to accommodate the flow reduction through the cooling packs 26.

This configuration for the recirculation fan 84 with inlet guide vane assembly 126 may be scaled in size for use with motors having single or multiple speed settings. The graph of FIG. 3 depicts the response for a single speed motor, which requires the simplest control scheme. For multi-speed motors, the inlet guide vanes 130 can be similarly incorporated to provide the continuously variable recirculation flow capability required to adjust for the reduction in fresh air flow through the cooling packs 26.

The present ECS 10 thus provides a simple method of maintaining a specified volume of air circulation through the aircraft 12 while allowing matching of the fresh air flow to the passenger loading requirements. The ECS 10 includes a bleed air control pack 16, and at least one cooling pack 26 and electrical controllers therefor to control the amount of fresh, bleed air from the aircraft engines which is cooled and conditioned within the cooling packs 26 for subsequent delivery to the aircraft 12. The ECS 10 further includes the recirculation fans 84 and inlet guide vane assemblies 126 for providing a variable flow of recirculation air for mixing with the fresh air from cooling packs 26 prior to delivery and circulation through the aircraft 12. By this arrangement, the desired air circulation within the aircraft 12 is maintained for varying passenger loads, and corresponding fresh air requirements.

Although preferred embodiments are specifically illustrated and described herein, it will be appreciated that many modifications and variations of the present invention are possible in light of the above teaching to those skilled in the art. It is preferred, therefore, that the present invention be limited not by the specific disclosure herein, but only by the appended claims.

We claim:

1. An environmental control system for a passenger aircraft including a passenger cabin receiving a variable passenger load and at least one engine providing a flow of high pressure fresh bleed air, the environmental control system comprising:
   means for selectively valving a variable flow of high pressure bleed air from the engine;
   cooling pack means for receiving said flow of bleed air and for conditioning said bleed air flow to provide a flow of pressurized, conditioned fresh air for delivery to the aircraft cabin;
   recirculation means for extracting a variable flow of recirculation air from the aircraft cabin;
   circulation means for mixing the variable flow of recirculation air with said conditioned fresh air, and for distributing the mixed air flow to said aircraft; and
   means for controlling both the flow of bleed air from said engine proportionately to said passenger load, and said recirculation air flow inversely proportionate to said passenger load at and above a selected passenger load and at or above a certain minimum recirculation flow for passenger loads less than said selected passenger load, to maintain a desired circulation rate through said aircraft cabin.

2. The environmental control system of claim 1, wherein said recirculation means further comprises:
   at least one recirculation air duct for conducting recirculation air from the aircraft cabin to said circulation means;
   a recirculation fan disposed within said at least one recirculation duct; and
   means for varying the recirculation air flow through said recirculation fan.

3. The environmental control system of claim 2, wherein said means for varying further comprises:
   an inlet guide vane assembly including a plurality of inlet guide vanes disposed within said recirculation duct immediately upstream of said recirculation fan; and
   motor and controller means for changing the angular orientation of said plurality of inlet guide vanes of said inlet guide vane assembly, said motor and controller means electrically connected and controlled by said means for controlling.

4. The environmental control system of claim 3 wherein said recirculation fan includes a single speed motor.

5. The environmental control system of claim 3, wherein said recirculation fan includes a multiple speed motor.

6. The environmental control system of claim 2, wherein said means for controlling further comprises:
   control panel means for receiving a command indicative of the passenger loading of the aircraft;
   electronic controller means for receiving said passenger loading of said aircraft from said control panel means, and for controlling the operation of said means for selectively valving said variable flow of high pressure bleed air, and for controlling the operation of said means for varying the recirculation air flow.

7. The environmental control system of claim 6, wherein said means for varying further comprises:
   an inlet guide vane assembly including a plurality of inlet guide vanes disposed within said recirculation duct immediately upstream of said recirculation fan; and
   motor and controller means for changing the angular orientation of said plurality of inlet guide vanes of said inlet guide vane assembly, said motor and controller means electrically connected and controlled by said electronic controller means.

8. The environmental control system of claim 7 wherein said plurality of inlet guide vanes are continuously adjustable between a minimum recirculation air flow rate corresponding to a maximum passenger loading, and a maximum recirculation air flow rate corresponding to a passenger loading of one half of the maximum passenger loading.

9. The environmental control system of claim 6, wherein said means for varying comprises a multiple speed motor connected to power said recirculation fan.

10. A method of maintaining a desired volume of air circulation through the cabin of a passenger aircraft receiving a variable passenger load and including at least one engine, comprising:
   providing a variable flow of high pressure bleed air from the engine;
   conditioning said bleed air flow to provide a flow of pressurized, conditioned fresh air for delivery to the aircraft cabin;
   extracting a variable flow of recirculation air from the aircraft cabin;
   mixing the variable flow of recirculation air with said conditioned fresh air within a mixing manifold;
   distributing the mixed air flow to said aircraft; and
   controlling the respective flow of bleed air from said engine proportionately to said passenger load, and the flow of recirculation air inversely proportionate to said passenger load at and above a selected passenger load and at or above a certain minimum recirculating flow for passenger loads less than said selected passenger load, to maintain a desire circulation rate through said aircraft cabin.

11. The method of claim 10, wherein said extracting step further comprises:
   conducting said recirculation air from the aircraft cabin to said mixing manifold within at least one recirculation air duct;
   providing a recirculation fan disposed within said at least one recirculation duct; and
   varying the recirculation air flow through said recirculation fan.

12. The method of claim 11, wherein said extracting step further comprises:
   entering the passenger loading of the aircraft to an electronic controller, said electronic controller connected to control the flow of said high pressure bleed air and the flow of said recirculation air.

13. The method of claim 12, wherein said step of varying the recirculation air flow further comprises:
   providing an inlet guide vane assembly including a plurality of inlet guide vanes disposed within said at least one recirculation duct immediately upstream of said recirculation fan; and
   changing the angular orientation of said plurality of inlet guide vanes of said inlet guide vane assembly in response to said electronic controller and said passenger loading.

14. The method of claim 13, wherein said plurality of inlet guide vanes are continuously adjustable between a minimum recirculation air flow rate corresponding to a maximum passenger loading, and a maximum recirculation air flow rate corresponding to a passenger loading of one half of the maximum passenger loading.

* * * * *